United States Patent
Mizuno et al.

(10) Patent No.: US 7,281,827 B2
(45) Date of Patent: Oct. 16, 2007

(54) VEHICLE HEADLIGHT APPARATUS

(75) Inventors: Ryu Mizuno, Kariya (JP); Hayato Nakano, Yokosuka (JP); Haruo Saitoh, Chigasaki (JP); Kazuhiko Nakashima, Miyoshi-cho (JP)

(73) Assignees: Denso Corporation, Kariya, Aichi-pref. (JP); Kanto Auto Works, Ltd., Yokosuka, Kanagawa-pref. (JP); Toyota Jidosha Kabushiki Kaisha, Toyota, Aichi-pref. (JP)

( * ) Notice: Subject to any disclaimer, the term of this patent is extended or adjusted under 35 U.S.C. 154(b) by 0 days.

(21) Appl. No.: 11/451,603

(22) Filed: Jun. 13, 2006

(65) Prior Publication Data

US 2006/0285342 A1    Dec. 21, 2006

(30) Foreign Application Priority Data

Jun. 17, 2005    (JP) .............................. 2005-177848

(51) Int. Cl.
*B69Q 1/00*    (2006.01)
(52) U.S. Cl. ...................... 362/466; 362/465; 362/467; 362/468
(58) Field of Classification Search ........ 362/464–468, 362/523–526; 315/77–83
See application file for complete search history.

(56) References Cited

U.S. PATENT DOCUMENTS 5,877,680 A * 3/1999 Okuchi et al. .............. 362/464
6,688,761 B2 * 2/2004 Kondo et al. ............... 362/466
7,150,546 B2 * 12/2006 Fukawa ...................... 362/464

FOREIGN PATENT DOCUMENTS

JP    08-142743    6/1996

* cited by examiner

*Primary Examiner*—Stephen F. Husar
(74) *Attorney, Agent, or Firm*—Nixon & Vanderhye P.C.

(57) ABSTRACT

A vehicle headlight apparatus includes a headlight and an actuator. The actuator horizontally changes a direction of an optical axis of the headlight. The vehicle headlight apparatus detects a rotational state of at least one predetermined wheel. The vehicle headlight apparatus determines whether a vehicle travels in a forward direction or a non-forward direction based on a detection result. A swivel operation, in which the actuator horizontally changes the direction of the optical axis of the headlight based on a steering operation of the vehicle, is performed when the vehicle headlight apparatus determines that the vehicle travels in the forward direction. The swivel operation is cancelled when the vehicle headlight apparatus determines that the vehicle travels in the non-forward direction.

7 Claims, 3 Drawing Sheets

VEHICLE HEADLIGHT APPARATUS

CROSS REFERENCE TO RELATED APPLICATION

This application is based on and incorporates herein by reference Japanese Patent Application No. 2005-177848 filed on Jun. 17, 2005.

BACKGROUND OF THE INVENTION

1. Field of the Invention

The present invention relates to a vehicle headlight apparatus, which performs a headlight operation, in which a direction of an optical axis of a headlight is changed in accordance with a traveling condition of a vehicle.

2. Description of Related Art

Conventionally, there has been proposed an adaptive front-lighting system (AFS) that radiates light in a direction, which a driver of a vehicle desires. The AFS is realized by changing a lighting direction (i.e., a direction of an optical axis) of a headlamp (headlight) of the vehicle. The AFS includes a leveling mechanism and a swivel mechanism for changing a direction of the optical axis of the headlamp. Here, the leveling mechanism vertically changes the direction of the optical axis, and the swivel mechanism horizontally changes the direction of the optical axis.

In the swivel mechanism of the above mechanisms, an actuator for changing the direction of the optical axis of the headlamp is driven based on input data, such as a headlamp switch signal, a vehicle speed and a steering angle. The swivel mechanism is permitted to be operated only when the vehicle travels in a forward direction. In contrast, when the vehicle travels in a backward direction, the above swivel mechanism is not permitted to be operated by a law because of security. Specifically, in a conventional vehicle having an automatic transmission (A/T vehicle), it is determined whether the vehicle travels in the forward direction based on an input signal of a shift position. Typically, the vehicle needs to travel in the forward direction in order to allow the swivel operation to be executed. When the inputted shift position signal indicates other than R (reverse drive position) or N (neutral position), that is, for example, P (parking position), L (first gear position), 2 (second gear position), D (forward drive position), it is determined that the vehicle travels in the forward direction (see Japanese Unexamined Patent Publication No. H8-142743).

However, in the above conventional technology for detecting whether the vehicle travels in the forward direction, it is a disadvantageous that the conventional technology cannot detect the actual traveling direction of the vehicle because the shift position only indicates the position of the shift lever. For example, when the shift position indicates N, it is impossible to detect the actual state of the vehicle (e.g., traveling in the forward direction, traveling in the backward direction or stopping) depending only on the information.

In a vehicle having a manually shifted transmission (M/T vehicle), a change lever corresponds to the shift lever in the A/T vehicle. In contrast to the A/T vehicle, the M/T vehicle is not designed in such a manner that signals are outputted based on a detected position of the change lever. Therefore, the traveling state of the vehicle cannot be detected based on the outputted signals. It is not certain that the installation of an additional device, which detects the position of the change lever to output a signal, is impossible from a technical point of view. However, it is disadvantageous that a cost will be increased when the additional device is provided. Also, it is disadvantageous that the actual traveling state of the vehicle cannot be detected similarly to the A/T vehicle when the change lever is located at the N position even in a case of the installation of the additional device.

SUMMARY OF THE INVENTION

The present invention is made in view of the above disadvantages. Thus, it is an objective of the present invention to provide a vehicle headlight apparatus, which obviates or mitigates at least one of the above disadvantages.

To achieve the objective of the present invention, there is provided a vehicle headlight apparatus, which includes a headlight, an actuator, a detecting means and a determining means. The actuator changes a direction of an optical axis of the headlight. The detecting means detects a rotational state of at least one predetermined wheel. The determining means determines whether a vehicle travels in a forward direction or a non-forward direction based on a detection result of the detecting means. A headlight operation, in which the actuator changes the direction of the optical axis of the headlight, is performed when the determining means determines that the vehicle travels in the forward direction. The headlight operation is cancelled when the determining means determines that the vehicle travels in the non-forward direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENT

Figure 1:
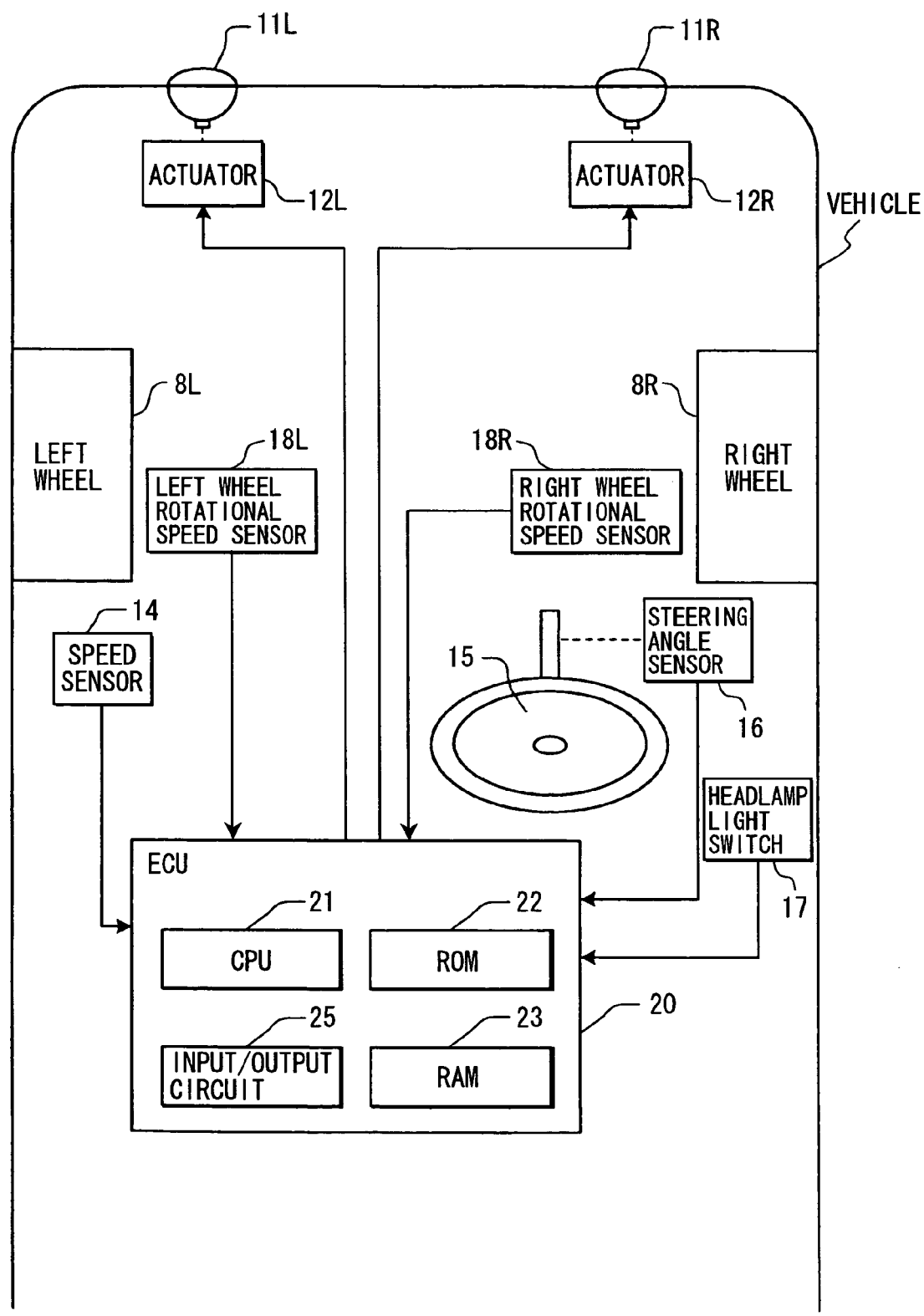
FIG. 1 is a block diagram showing a system structure of a vehicle headlight apparatus of a first embodiment of the present invention.

An embodiment will be described with reference to accompanying drawings. In FIG. 1, a left headlamp 11L and a right headlamp 11R are provided on a front side of a vehicle to serve as headlights. An electronic control unit (ECU) 20 includes a central processing unit (CPU) 21, a ROM 22, a RAM 23 and a logical operation circuit. The CPU 21 operates well-known various computing processes. The ROM 22 stores controlling programs. The RAM 23 stores various data sets. The logical operation circuit includes an input/output circuit 25.

The ECU 20 receives outputs signals supplied by a vehicle speed sensor 14, a steering angle sensor 16, the headlamp light switch 17, a left wheel rotational speed sensor 18L, a right wheel rotational speed sensor 18R and other various sensors. The vehicle speed sensor 14 senses a vehicle speed. The steering angle sensor 16 senses a steering angle of a steering wheel 15. The headlamp light switch 17 turns on the headlamps 11L, 11R. The left wheel rotational speed sensor 18L senses a left wheel rotational speed of a front left wheel 8L of the vehicle. The right wheel rotational speed sensor 18R senses a right wheel rotational speed of a front right wheel 8R of the vehicle. An output signal supplied by the ECU 20 is inputted to each of left and right actuators 12L, 12R, which correspond to the left and right headlamps 11L, 11R, such that the directions of the optical axes of the headlamps 11L, 11R are adjusted. Here, the left and right headlamps 11L, 11R serves as the headlight in the present invention. The left and right wheel rotational speed sensor 18L, 18R serves as detecting means in the present invention.

Figure 2:
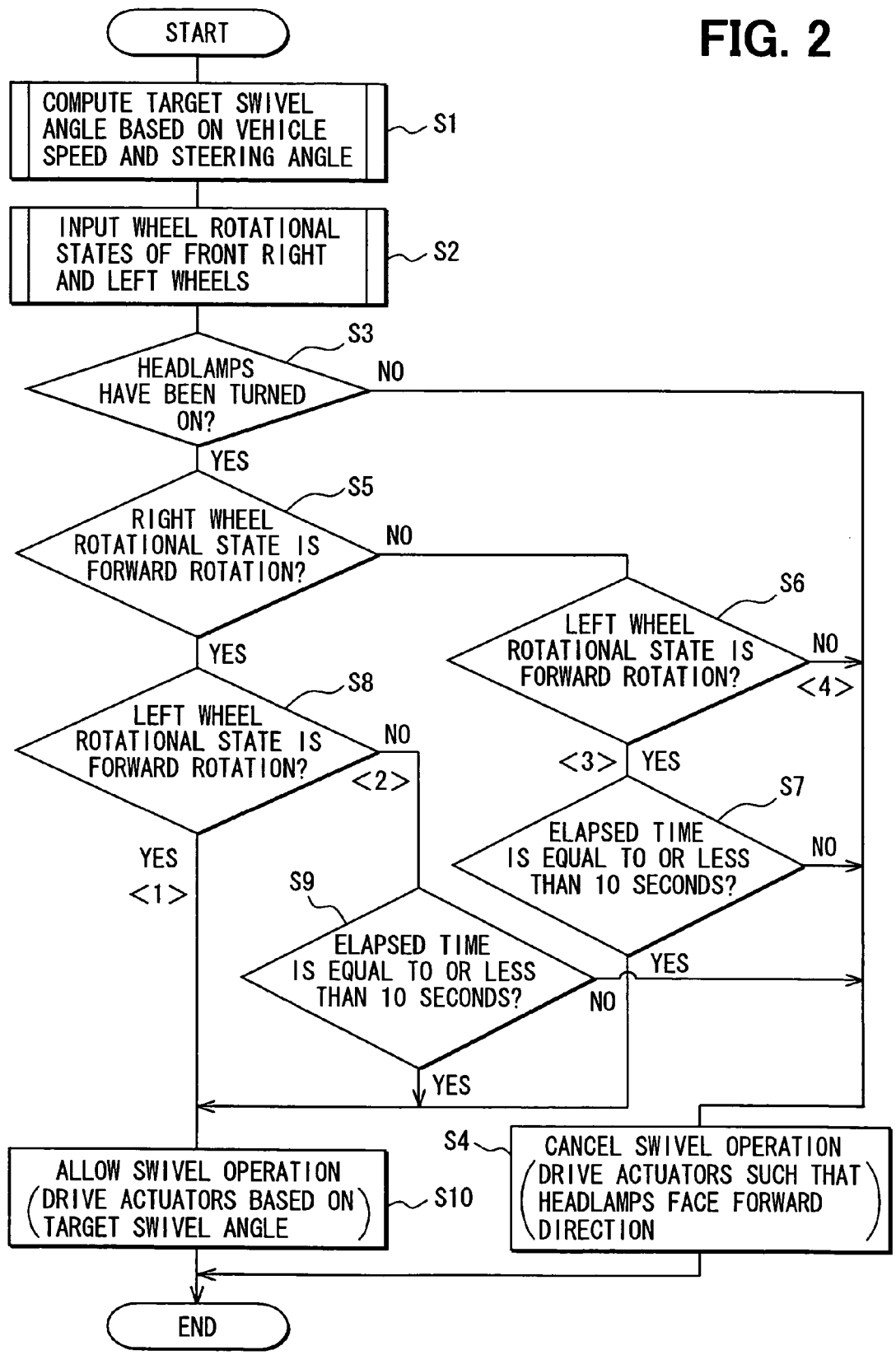
FIG. 2 is a flowchart showing a flow of a swivel control process.
Figure 3:
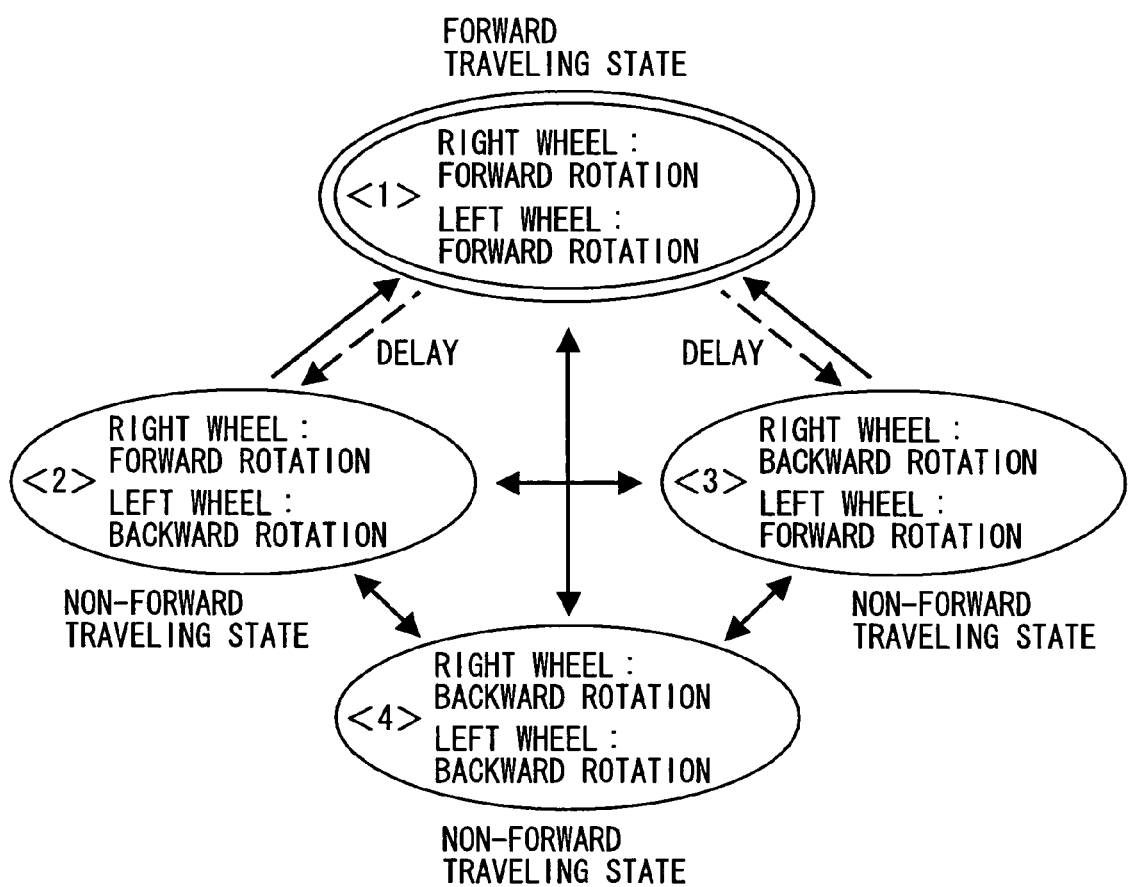
FIG. 3 is a diagram showing changes of a vehicle traveling state in relation to a two-wheels rotating combination of right and left wheels.

Next, a swivel control process executed by the CPU 21 will be described with reference to FIGS. 2 and 3. FIG. 2 is a flowchart showing a flow of the swivel control process, and a program describing the flowchart of the swivel control process is stored in the ROM 22. The CPU 21 reads the swivel control process program from the ROM 22 to execute the program. FIG. 3 is a diagram showing changes of a vehicle traveling state in relation to a two-wheels rotating combination of right and left wheels. A state <1> is determined as a vehicle forward traveling state, where the vehicle travels in the forward direction, and each of states <2> to <4> it determined as a vehicle non-forward traveling state, where the vehicle travels in a non-forward direction.

At step 1, a target swivel angle is computed based on the vehicle speed supplied by the vehicle speed sensor 14 and the steering angle supplied by the steering angle sensor 16. Hereinafter, step 1 will be abbreviated as S1 and other steps will be similarly abbreviated. Here, the target swivel angle may be typically defined as a target angle between the optical axis of the headlamp and a longitudinal axis of the vehicle when the direction of the optical axis of the headlamp is changed based on a vehicle traveling condition in a swivel operation. At S2, there are inputted left and right wheel rotational states of the front left and right wheels 8L, 8R, which rotational states are determined based on the output signals supplied by the left and right wheel rotational speed sensors 18L, 18R.

The rotational states are determined as follows. For example, when the rotational speed of the wheel detected by the wheel rotational speed sensor indicates zero or a positive value, the wheel stops or rotates in a reference direction. In the inputting process of the rotational state of the wheel, when the rotational speed indicates zero or the positive value (i.e., when the wheel stops or rotates in the reference direction), "a forward rotation" is inputted as the wheel rotational state. Also, when the wheel rotational speed indicates a negative value (i.e., when the wheel rotates in an opposite direction, which is opposite from the reference direction), "a backward rotation" is inputted as the wheel rotational state.

Next, it is determined at S3 whether the headlamps 11L, 11R have been turned on based on the output signal supplied by the headlamp light switch 17. When the headlamps 11L, 11R have been turned off (NO at S3), the swivel operation is cancelled at S4 (i.e., the actuators 12L, 12R are driven such that the headlamps 11L, 11R face the forward direction of the vehicle at S4). This means that the direction of the optical axis of the headlamps 11L, 11R is set to a predetermined direction.

When the headlamps 11L, 11R have been turned on (YES at S3), it is determined at S5 whether the right wheel rotational state is the forward rotation (i.e., stop or rotation in the reference direction). When the right wheel rotational state is not the forward direction (NO at S5), that is when the right wheel rotational state is the backward rotation, it is determined at S6 whether the left wheel rotational state is the forward rotation. When the left wheel rotational state is not forward rotation (NO at S6), that is when the left wheel rotational state is the backward rotation, a vehicle traveling state is determined as the state <4> shown in FIG. 3. Here, the state <4> indicates the vehicle non-forward traveling state. Then, at S4, the swivel operation is cancelled (i.e., the actuators 12L, 12R are driven such that the headlamps 11L, 11R face the forward direction of the vehicle at S4).

When it is determined at S6 that the left wheel rotational state is the forward rotation (YES at S6), the vehicle traveling state is determined as the state <3> shown in FIG. 3. Here, the state <3> also indicates the vehicle non-forward traveling state. Then, it is determined at S7 whether an elapsed time since a time of that the right wheel rotational state is changed from the forward rotation to the backward rotation is equal to or less than ten seconds. When it is determined at S7 that the elapsed time exceeds ten seconds (NO at S7), the swivel operation is cancelled at S4 (i.e., the actuators 12L, 12R are driven such that the headlamps 11L, 11R face the forward direction at S4).

When it is determined at S7 that the elapsed time is equal to or less than ten seconds (YES at S7), the swivel operation is allowed (executed) at S10 (i.e., the actuators 12L, 12R are driven such that the directions of the optical axes of the headlamps 11L, 11R are horizontally changed based on the target swivel angle at S10). In other words, the swivel operation is allowed to be performed even in an opposite-directions rotating combination (second rotating combination) as long as it has been equal to or less than a predetermined delay time (predetermined elapsed time) (e.g., ten seconds) since the time of that the right wheel rotational state is changed from the forward rotation to the backward rotation during a forward-directions rotating combination (first rotating combination). Therefore, the swivel operation may not be cancelled (i.e., the headlamps 11L, 11R are limited from being set to face the forward direction during the swivel operation) even when the rotating combination of the wheels temporally becomes the opposite-directions rotating combination due to skids of tires or erroneous output signals. As a result, dynamic changes of the direction of the optical axes of the headlamps 11L, 11R are limited. Here, the opposite-directions rotating combination (second rotating combination) is defined as a rotating combination of the wheels, where, for example, the right wheel rotational state is the backward rotation simultaneously while the left wheel rotational rotation is the forward rotation. Also, the forward-directions rotating combination (first rotating combination) is defined as a rotating combination of the wheels, where both the left and right wheel rotational states are the forward rotations.

When the right wheel rotational state is the forward rotation (YES at S5), it is determined at S8 whether the left wheel rotational state is the forward rotation. When it is determined at S8 that the left wheel rotational state is not the forward rotation (NO at S8), the vehicle traveling state is determined as the state <2> shown in FIG. 3. Here, the state <2> indicates the vehicle non-forward traveling state. Then, it is determined at S9 whether an elapsed time since a time of that the left wheel rotational state is changed from the forward rotation to the backward rotation is equal to or less than ten seconds. When it is determined at S9 that the elapsed time exceeds ten seconds (NO at S9), the swivel operation is cancelled at S4 (i.e., the actuators 12L, 12R are driven such that the headlamps 11L, 11R face the forward direction at S4). When it is determined at S9 that the elapsed time is equal to or less than ten seconds (YES at S9), the swivel operation is allowed to be performed at S10 (i.e., the actuators 12L, 12R are driven such that the directions of the optical axes of the headlamps 11L, 11R are horizontally changed based on the target swivel angle at S10). Similarly to the above description at S7, the swivel operation is allowed to be performed even in the opposite-directions rotating combination as long as it has been equal to or less than the predetermined delay time (ten seconds) since the time of that the left wheel rotational state is changed from the forward rotation to the backward rotation during the forward-directions rotating combination. Therefore, the swivel operation will not be cancelled (i.e., the headlamps 11L, 11R are limited from being set to face the forward direction during the swivel operation) even when the wheel rotating combination temporally becomes the opposite-directions rotating combination due to the skids of tires or the erroneous output signals. As a result, the dynamic changes of the optical axes of the headlamps 11L, 11R are also limited. Here, in this case, the opposite-directions rotating combination is defined as the rotating combination of the wheels, where the right wheel rotational state is the forward rotation simultaneously while the left wheel rotational state is the backward rotation.

When the left wheel rotational state is the forward rotation (YES at S8), the vehicle traveling state is determined as the state <1> shown in FIG. 3. The state <1> indicates the vehicle forward traveling state. Then, the swivel operation is allowed at S10 (i.e., the actuators 12L, 12R are driven such that the directions of the optical axes of the headlamps 11L, 11R are horizontally changed based on the target swivel angle at S10). Steps 5 to 9 (S5 to S9) shown in the flowchart in FIG. 2 correspond to determining means in the present invention.

As is obvious from the above description, the wheel rotational speed sensors 18L, 18R detect a rotational state (rotational direction) of each of the pair of wheels 8L, 8R. When the rotational state of each of the wheels 8L, 8R is detected as stopping or rotating in the reference direction, it is determined that the vehicle travels in the forward direction (i.e., the vehicle forward traveling state), and the swivel operation is allowed to be performed. When the rotational state of the wheels 8L, 8R does not satisfies the above rotational state (e.g., when both the left and right wheels 8L, 8R rotate in the backward direction, when the left and right wheels 8L, 8R rotate in the opposite directions with each other), it is determined that the vehicle travels in the non-forward direction (i.e., the vehicle non-forward traveling state) and the swivel operation is cancelled. Therefore, the vehicle traveling state (the vehicle forward traveling state, the vehicle non-forward traveling state) can be determined based on the wheel rotational state information obtained from the vehicle. Thus, it is possible to determine whether the swivel operation is performed or not based on the actual vehicle traveling state, which is accurately determined, regardless of the a specification of the vehicle, such as a specification of a mounted transmission system. Also, at the same time, flexibility in the control of the swivel operation can be improved. In the opposite-directions rotating combination, in which one of the right and left wheels rotates in the opposite direction, the vehicle traveling state is determined as the vehicle non-forward traveling state although the actual vehicle traveling direction is not known. Thus, the swivel operation is performed only when the vehicle traveling state is determined as the vehicle forward traveling state, in which the vehicle surely travel in the forward direction. Here, the opposite-directions rotating combination may occur due to the skids caused by a sharp turn of the steering or by the erroneous output signals from the sensors.

Also, in the present embodiment, the rotational state (rotation in the reference direction, rotation in the opposite direction, stop) of each of the wheels can be reliably detected based on the wheel rotational state data outputted by the wheel rotational speed sensors (rotational angle sensors) 18L, 18R, which are existing vehicle devices. Thus, the cost increase can be limited when the embodiment is realized.

Here, additional advantages and modifications will readily occur to those skilled in the art. The invention in its broader terms is therefore not limited to the specific details, representative apparatus, and illustrative examples shown and described.

For example, in the present embodiment, it is determined whether the vehicle traveling state is the vehicle forward traveling state or the vehicle non-forward traveling state based on the right and left wheel rotational speeds of the front right and left wheels 8L, 8R. However, the vehicle traveling state may be alternatively determined based on the right and left wheel rotational speeds of rear wheels (not shown). Also, the vehicle traveling state may be alternatively determined based on the right and left wheel rotational speeds of both the front and rear wheels.

In the present embodiment, the predetermined delay interval (predetermined elapsed time) between the time, at which the rotational state of the wheel is changed from the forward-directions rotating combination to the opposite-directions rotating combination, and the time, at which the swivel operation is cancelled, is set at ten seconds. However, the predetermined delay interval may be set at any value based on the specification of the vehicle.

The present invention can be applied to a vehicle headlight apparatus, which can perform a swivel operation, in which the direction of the optical axis of the headlight is horizontally changed correspondingly to the steering operation.

The present invention can be applied to a vehicle headlight apparatus, which can perform a leveling operation, in which the direction of the optical axis of the headlight is vertically changed correspondingly to a traveling condition of the vehicle (e.g., a slope of a road on which the vehicle travels).

What is claimed is:

1. A vehicle headlight apparatus, comprising:
a headlight;
an actuator that changes a direction of an optical axis of the headlight;
a detecting means for detecting a rotational state of at least one predetermined wheel; and
a determining means for determining whether a vehicle travels in a forward direction or a non-forward direction based on a detection result of the detecting means, wherein:
a headlight operation, in which the actuator changes the direction of the optical axis of the headlight, is performed when the determining means determines that the vehicle travels in the forward direction; and
the headlight operation is cancelled when the determining means determines that the vehicle travels in the non-forward direction.

2. The vehicle headlight apparatus according to claim 1, wherein:
the at least one predetermined wheel includes a pair of wheels having first and second wheels, which are located on opposite sides of the vehicle;
the detecting means detects a first rotational state of the first wheel and a second rotational state of the second wheel;

the determining means determines that the vehicle travels in the forward direction when the following condition is satisfied:
the detecting means detects that each of the first and second wheels stops or rotates in a reference direction; and
the determining means determines that the vehicle travels in the non-forward direction when the above condition is not satisfied.

3. The vehicle headlight apparatus according to claim 2, further comprising:
an elapsed time computing means for computing an elapsed time since a time of that a rotating combination of the first and second wheels is changed from a first rotating combination to a second rotating combination, wherein:
in the first rotating combination, each of the first and second wheels stops or rotates in the reference direction; and
in the second rotating combination, one of the first and second wheels stops or rotates in the reference direction while an other of the first and second wheels rotates in an opposite direction, which is opposite from the reference direction, wherein:
the headlight operation is cancelled when the elapsed time computed by the elapsed time computing means exceeds a predetermined elapsed time.

4. The vehicle headlight apparatus according to claim 2, wherein:
the detecting means includes a pair of vehicle speed sensors;
one of the pair of the vehicle speed sensors is provided to the first wheel; and
an other of the pair of the vehicle speed sensors is provided to the second wheel.

5. The vehicle headlight apparatus according to claim 1, wherein the actuator sets the direction of the optical axis of the headlight to a predetermined direction when the headlight operation is cancelled.

6. The vehicle headlight apparatus according to claim 1, wherein the headlight operation is a swivel operation, in which the actuator horizontally changes the direction of the optical axis of the headlight based on a steering operation of the vehicle.

7. The vehicle headlight apparatus according to claim 1, wherein the headlight operation is a leveling operation, in which the actuator vertically changes the direction of the optical axis of the headlight based on a traveling condition of the vehicle.

* * * * *